Patented May 6, 1952

2,595,891

UNITED STATES PATENT OFFICE 2,595,891

CYCLOPOLYSILOXANES

Robert O. Sauer, Schenectady, N. Y., assignor to General Electric Company, a corporation of New York No Drawing. Application March 21, 1946, Serial No. 656,164

4 Claims. (Cl. 260—448.2)

1

This invention relates to new and useful chemical compounds, and more particularly is concerned with compounds known as polysiloxanes. Specifically the invention relates to new cyclopolysiloxanes corresponding to the general formula $(RSiHO)_n$, where R represents a lower alkyl radical (e. g., methyl, ethyl, propyl, isopropyl, n-butyl, isobutyl, sec.-butyl, etc.), and $n$ represents an integer which is at least 4 and not more than 6, and to methods of preparing such cyclopolysiloxanes. Cyclopolysiloxanes corresponding to, for example, the general formula $(RSiHO)_4$, where R represents a lower alkyl radical, also may be represented by the formula

I

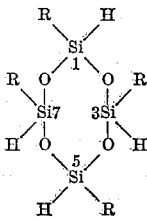

In a similar manner structural formulas for cyclopolysiloxanes corresponding to the general formulas $(RSiHO)_5$ and $(RSiHO)_6$, that is, cyclopolysiloxanes containing 5 or 6 Si atoms linked with oxygen atoms in a ring structure, may be written.

It was known prior to my invention that cyclic compounds having the formula $[(CH_3)_2SiO]_n$, where $n$ is an integer which is at least 3 and not more than 10 could be prepared, for example by heating the higher boiling polymers of dimethyl silicone having the formula $[(CH_3)_2SiO]_n$, where $n$ is an integer greater than 10, at an elevated temperature (above 200° C.) in a non-oxidizing atmosphere. Such cyclic silicon compounds are more fully described and are specifically claimed in the copending application of Winton I. Patnode, Serial No. 463,813, filed October 29, 1942, now abandoned and assigned to the same assignee as the instant invention. The compounds of the present invention, more particularly cyclopolysiloxanes corresponding to the general formula $(CH_3SiHO)_n$, where $n$ presents an integer which is at least 4 and not more than 6, differ from certain of those disclosed by Patnode in the aforementioned application in that, in-

2 stead of two methyl groups being attached directly to each nuclear Si atom, there are attached thereto one methyl group and one hydrogen atom.

The cyclopolysiloxanes of this invention are especially valuable as intermediates in the preparation of other organo-silicon compounds, for instance linear polysiloxanes of the kind disclosed and claimed in my copendng application Serial No. 656,163. These cyclic compounds, specifically the symmetrical polymethylcyclopolysiloxanes, also are useful in making other new organo-polysiloxanes, more particularly oils of improved viscosity-temperature coefficient, as disclosed and claimed in the copending application of Donald F. Wilcock, Serial No. 656,162 now U. S. Patent No. 2,491,843. Both of these applications are being filed concurrently herewith and are assigned to the same assignee as the present invention.

The cyclopolysiloxanes with which this invention is concerned may be prepared in various ways. One suitable method comprises causing a halogenosilane corresponding to the general formula $RSiHX_2$, where R represents a lower alkyl radical and X represents a halogen selected from the class consisting of chlorine and bromine, to react with water under conditions whereby there are obtained cyclopolysiloxanes corresponding to the general formula $(RSiHO)_n$, where R has the meaning above given and $n$ represents an integer which is at least 4 and not more than 6, and isolating the said cyclopolysiloxanes, e. g., by distillation, from the resulting reaction mass. The halogenosilanes used in practicing this method may be produced, for example, by the interaction of a lower alkyl magnesium halide, e. g., ethyl magnesium chloride, propyl magnesium bromide, etc., with trichlorosilane, $HSiCl_3$, or tribromosilane, $HSiBr_3$. In these reactions approximately one mole of the appropriate Grignard reagent dissolved in ether is used for each mole of the trihalogenosilane, and the Grignard solution is added slowly to the trihalogenosilane. Examples of halogenosilanes that may be prepared in this way are the methyl, ethyl, propyl, isopropyl, n-butyl, isobutyl, sec.-butyl, etc., dichloro and dibromo silanes ($RSiHCl_2$ and $RSiHBr_2$).

Although an oil of about 20-25 centistokes viscosity usually results when, for instance, dimethyl dichlorosilane is hydrolyzed by adding it directly to water or to a mixture of ice and water, a somewhat different result is obtained with methyldichlorosilane, $CH_3SiHCl_2$. The product first formed is a highly viscous oil which is transformed in a few minutes into an opalescent, sticky, rubbery gel.

Surprisingly it was found that under certain conditions halogenosilanes corresponding to the general formula $RSiHX_2$, where R and X have the meanings given in the preceding paragraph, specifically methyldichlorosilane, can be so hydrolized (e. g., at a temperature of minus 10° to plus 15° C.) as to obviate the relatively rapid formation of a polymer (rubbery gel) of high molecular weight and to yield cyclopolysiloxanes of the kind set forth in the first paragraph of this specification, which cyclopolysiloxanes can be separated from the reaction mass in the form of substantially pure compounds by suitable distillation technique. This result can be obtained, for example, by suitably admixing the halogenosilane and a cold mixture of water (or ice) and an organic diluent which is insoluble or substantially insoluble in water, more particularly by slowly adding the halogenosilane, e. g., methyldichlorosilane, to said mixture of water (or ice) and organic diluent while vigorously stirring the mixture. Examples of inert organic diluents that may be employed in this way are diethyl ether, dipropyl ether, benzene, low-boiling petroleum fractions, etc. Instead of water alone, I may use alcohol-water mixtures, for instance mixtures of water and, for example, methanol, ethanol, propanol, butanol, mixed amyl alcohols, n-hexyl alcohol, etc. The inert organic diluent or mixture thereof with an alcohol appears to increase the proportion of cyclopolysiloxanes that are formed and suppresses their polymerization by reducing the concentration of halogen acid in the reaction mass.

It was not known prior to my invention and in no way could have been predicted that a lower alkyl dichloro or dibromo silane could be caused to yield cyclopolysiloxanes of the kind with which this invention is concerned upon reaction with a hydrolysis medium comprising water. The unobvious nature of my discovery will better be appreciated when it is considered that some prior investigators have considered that the liquid products obtained by the hydrolysis of a dimethyldihalogenosilane, specifically dimethyldichlorosilane, consist primarily of long chain molecules and a small amount of a cyclic trimer $[(CH_3)_2SiO]_3$ (Hyde and De Long, Journal of the American Chemical Society, 63, 1194–6). It also is pointed out in the aforementioned Patnode application Serial No. 463,813 that the cyclic trimer $[(CH_3)_2SiO]_3$, is one of the constituents of the product of hydrolysis of dimethyldichlorosilane with a quantity of water substantially in excess of that calculated as necessary for complete hydrolysis of the said dichlorosilane. In marked contrast, no trimethylcyclotrisiloxane (sym. - trimethylcyclotrisiloxane), $(CH_3SiHO)_3$, was found in the product I obtained by a somewhat similar treatment of methyldichlorosilane, more particularly by adding methyldichlorosilane to a mixture of an inert organic diluent, specifically diethyl ether, and water in the form of cracked ice, the latter representing an amount of water substantially in excess of that theoretically required for complete hydrolysis of the methyldichlorosilane, and stirring the reaction mass for a further period after the addition of the aforesaid lower alkyl dichlorosilane.

A surprising characteristic of the cyclopolysiloxanes of my invention as compared with the cyclic polymers of dimethyl silicone described in the aforementioned Patnode application is that the reactivity of the siloxane linkages toward acid cleavage is apparently enhanced, as evidenced by the fact that 1,3,5,7-tetramethylcyclotetrasiloxane, which normally is a liquid, is converted to a solid by agitating it with 20% aqueous hydrochloric acid for three hours. The hydrochloric acid apparently cleaves the siloxane linkages with such ease that a high-molecular weight cyclic polymer containing the unit structure

and having a composition corresponding substantially to the formula $(CH_3SiHO)_n$, where $n$ represents a large whole number (possibly 15 to 30 or more), is formed. The greater reactivity of the siloxane linkages in the compounds of my invention, e. g., the methyl derivatives, as compared with the corresponding cyclic polymers of dimethyl silicone, is further shown by the fact that they polymerize to semisolid or solid bodies on standing for a prolonged period, e. g., 9 to 12 months or more, at room temperature while exposed to air and light. The enhanced reactivity of the siloxane linkages in my new compounds may be due to a diminution of the "shielding effect" of the groups attached to silicon since the hydrogen atom is smaller than a methyl group.

In order that those skilled in the art better may understand how the present invention may be carried into effect, the following examples are given by way of illustration and not by way of limitation:

EXAMPLE 1

Four moles (460 g.) of a lower alkyl dihalogenosilane, specifically methyl dichlorosilane, B. P. 41.3° C. (760 mm.), 61.4% Cl, was added with vigorous stirring to a mixture of 1 liter of an inert organic diluent, more particularly diethyl ether containing a small amount of benzene, and 2 kilograms of cracked ice over a half-hour period. The temperature of the hydrolyzing mixture dropped from 0° C. to minus 10° C., but rose finally to plus 7° C. After stirring for an additional half hour the aqueous layer was separated and the organic phase washed (three times) with water until it was substantially neutral, more particularly neutral to methyl orange. After removal of the ether and the small amount of benzene, the product was fractionated by distillation first at atmospheric pressure and then under reduced pressure as the temperature of distillation was increased. By this distillation there was obtained, by weight, about 36% of 1,3,5,7-tetramethylcyclotetrasiloxane, B. P. 134.5–134.9° C. (755 mm.), about 17% of 1,3,5,7,9-pentamethylcyclopentasiloxane, B. P. 168.6–168.9° C. (755 mm.), and about 4½% of impure 1,3,5,7,9,11-hexamethylcyclohexasiloxane, B. P. 92.6–93° C. (21 mm.), together with forerunnings and intermediate fractions amounting to about 14½% and a residue of about 28%. No effort was made to identify the composition of this residue. However, it is possible that it comprised a mixture of 1,3,5,7,9,11,13-heptamethylcycloheptasiloxane, 1,3,5,7,9,11,13,15-octamethylcycloöctasiloxane, 1,3,5,7,9,11,13,15,17-nonamethylcyclononasiloxane and higher homologues, as well as other compounds. The impure hexamethyl derivative was refractionated to obtain a purer material having a boiling point of 76–77° C. at 10.2 mm. pressure. Other data on the characteristics of the tetramer, pentamer and hexamer (purified material) are given in the following table:

Table

|  | $n_D^{20}$ | $d_4^{20}$ (vac.) | $R_D$ | M. P. (° C.) | Mol. Weight Calcd. | Mol. Weight Found [1] | Percent H (—Si) [2] Found |
|---|---|---|---|---|---|---|---|
| Tetramer | 1.3870 | 0.9912 | 0.2375 | −69±3 | 240.4 | 239, 241, 244 | 1.64, 1.61 |
| Pentamer | 1.3912 | 0.9985 | 0.2381 | −108±3 | 300.5 | 298, 297, 297 | 1.65 |
| Hexamer | 1.3944 | 1.006 | 0.2380 | −79±2 | 360.6 | 360 | 1.67 |

[1] Cryoscopic in cyclohexane; maximum concentration of solute in weight per cent: tetramer, 0.56; pentamer, 0.72; hexamer, 0.78.
[2] Theoretical for $CH_3SiHO$, 1.68.

In separating the above-described cyclopolysiloxanes by distillation from the hydrolyzate, the distillation took place under non-oxidizing or substantially non-oxidizing conditions since the forerunnings swept the distillation apparatus free or substantially free from air. In this way oxidation of the hydrolyzate and of the compounds distilled therefrom during distillation was obviated or minimized.

In a manner similar to that described above with particular reference to the preparation of 1,3,5,7 - tetramethylcyclotetrasiloxane, 1,3,5,7,9-pentamethylcyclopentasiloxane and 1,3,5,7,9,11-hexamethylcyclohexasiloxane, other lower alkyl cyclopolysiloxanes of similar structure may be obtained by hydrolyzing the corresponding lower alkyl dichloro or dibromo silanes, numerous examples of which have been given hereinbefore, and isolating the resulting cyclopolysiloxanes from the oily hydrolyzate.

Another method by which the cyclopolysiloxanes of this invention may be prepared is by thermal rearrangement in an inert atmosphere, e. g., nitrogen, of the higher molecular weight cyclopolysiloxanes to yield lower molecular weight materials. For example, a hydrolysis product obtained by hydrolyzing a lower alkyl dichloro or dibromo silane as above described with particular reference to methyldichlorosilane, and from which the tetramer, pentamer and hexamer have been removed, may be heated at an elevated temperature, e. g., at about 300° to 400° C., in a nitrogen or other inert atmosphere, to yield varying amounts of tetramer, pentamer and hexamer.

The cyclopolysiloxanes of this invention and polymers thereof may be oxidized, as shown by the following example:

EXAMPLE 2

The oxidation of a sample of what originally was fairly pure 1,3,5,7,9-pentamethylcyclopentasiloxane, B. P. 56° C. (10 mm.), $n_D^{20}$ 1.3913, but which had polymerized slowly to a heavy oil on standing in a glass bottle for 8 months (after 9 months this material had gelled to a soft, rubbery solid) was effected in an all-glass apparatus.

A sample of the heavy oil, which when analyzed before oxidation gave a hydrogen-to-silicon ratio of 0.99, was heated at 100° C. in an atmosphere of oxygen while agitating vigorously with a solenoid-actuated plunger. After 17 hours 216 mg. (3.6 millimols, based on the weight of the $CH_3SiHO$ unit) absorbed 0.85 millimol of oxygen. This absorption corresponds to the oxidation of 1.70 millimols of $CH_3SiHO$ units according to the equation:

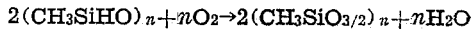

$$2(CH_3SiHO)_n + nO_2 \rightarrow 2(CH_3SiO_{3/2})_n + nH_2O$$

The viscous oil was converted to a white powder and, in a cooler portion of the oxidizing system, droplets of a clear liquid condensed. These droplets were probably water since they were found to be water-soluble. Analysis of the white oxidation product showed the presence of 1.87 millimols of hydrogen. Thus, by analysis before and after oxidation the ratio of the decrease in the millimols of silicon-hydrogen bonds to the millimols of oxygen absorbed was found to be approximately 2 as required by the above equation.

The following example illustrates the enhanced reactivity of the siloxane linkages in the compounds of my invention as compared with the same linkages in the cyclic polymers of dimethyl silicone:

EXAMPLE 3

A. A quantity of octamethylcyclotetrasiloxane, $[(CH_3)_2SiO]_4$, M. P. 17.5° C., was shaken with concentrated hydrochloric acid (35–37% by weight HCl) for 24 hours. The product, which was still liquid, was found to have a melting point of 14.3° C., indicating that only a relatively small change in its composition had taken place.

B. Ten ml. of concentrated hydrochloric acid was added to a mixture of 10 ml. of 1,3,5,7-tetramethylcyclotetrasiloxane and 10 ml. of distilled water, and the resulting mixture was shaken vigorously. After two hours the oily layer was quite viscous, and there was a slight gas pressure in the closed bottle. At the end of three hours the oily layer had been converted to an opalescent, rubbery solid. In other words, a very material change in the composition of the oily 1,3,5,7-tetramethylcyclotetrasiloxane had taken place even though a less highly concentrated solution of hydrochloric acid had been used than was employed in treating the octamethylcyclotetrasiloxane of (A). A slight gas pressure was again noted in the container.

In a manner similar to that hereinbefore described with particular reference to the preparation of 1,3,5,7 - tetramethylcyclotetrasiloxane, 1,3,5,7,9 - pentamethylcyclopentasiloxane and 1,3,5,7,9,11 - hexamethylcyclohexasiloxane, other cyclopolysiloxanes embraced by the general formula $(RSiHO)_n$, where R represents a lower alkyl radical and $n$ represents an integer which is at least 4 and not more than 6, may be prepared and thereafter polymerized. Examples of such compounds and polymers thereof are:

1,3,5,7-tetraethylcyclotetrasiloxane
1,3,5,7-tetrapropylcyclotetrasiloxane
1,3,5,7-tetraisopropylcyclotetrasiloxane
1,3,5,7-tetra-n-butylcyclotetrasiloxane
1,3,5,7-tetraisobutylcyclotetrasiloxane 1,3,5,7-tetra-sec.-butylcyclotetrasiloxane
1,3,5,7,9-pentaethylcyclopentasiloxane
1,3,5,7,9-pentapropylcyclopentasiloxane
1,3,5,7,9-pentaisopropylcyclopentasiloxane
1,3,5,7,9-penta-n-butylcyclopentasiloxane
1,3,5,7,9-pentaisobutylcyclopentasiloxane
1,3,5,7,9-penta-sec.-butylcyclopentasiloxane
1,3,5,7,9,11-hexaethylcyclohexasiloxane
1,3,5,7,9,11-hexapropylcyclohexasiloxane
1,3,5,7,9,11-hexaisopropylcyclohexasiloxane
1,3,5,7,9,11-hexa-n-butylcyclohexasiloxane
1,3,5,7,9,11-hexaisobutylcyclohexasiloxane
1,3,5,7,9,11 - hexa - sec. - butylcyclohexasiloxane, etc.; and polymers thereof.

What I claim as new and desire to secure by Letters Patent of the United States is:

1. A cyclopolysiloxane corresponding to the general formula $(CH_3SiHO)_n$, where $n$ represents an integer which is at least 4 and not more than 6.
2. 1,3,5,7-tetramethylcyclotetrasiloxane.
3. 1,3,5,7,9-pentamethylcyclopentasiloxane.
4. 1,3,5,7,9,11-hexamethylcyclohexasiloxane.

ROBERT O. SAUER.

REFERENCES CITED

The following references are of record in the file of this patent:

UNITED STATES PATENTS

| Number | Name | Date |
|---|---|---|
| 2,258,220 | Rochan | Oct. 7, 1941 |
| 2,265,962 | Bent | Dec. 9, 1941 |
| 2,306,222 | Patnode | Dec. 22, 1942 |
| 2,383,521 | Sowa | Aug. 28, 1945 |
| 2,386,259 | Norton | Oct. 9, 1945 |

OTHER REFERENCES

Hyde et al.: J. Amer. Chem. Soc., vol. 63 (1941), pp. 1194–1196.

Stock et al.: Berichte der Deut. Chem. Ges., vol. 52, pp. 713–714.